Sept. 15, 1942.　　　　　M. DUDEN　　　　　2,295,895

SWEEP RAKE STACKER AND LOADER

Filed Sept. 3, 1940　　　3 Sheets—Sheet 1

INVENTOR.
MERRITT DUDEN
BY M. Talbert Dick
ATTORNEY.

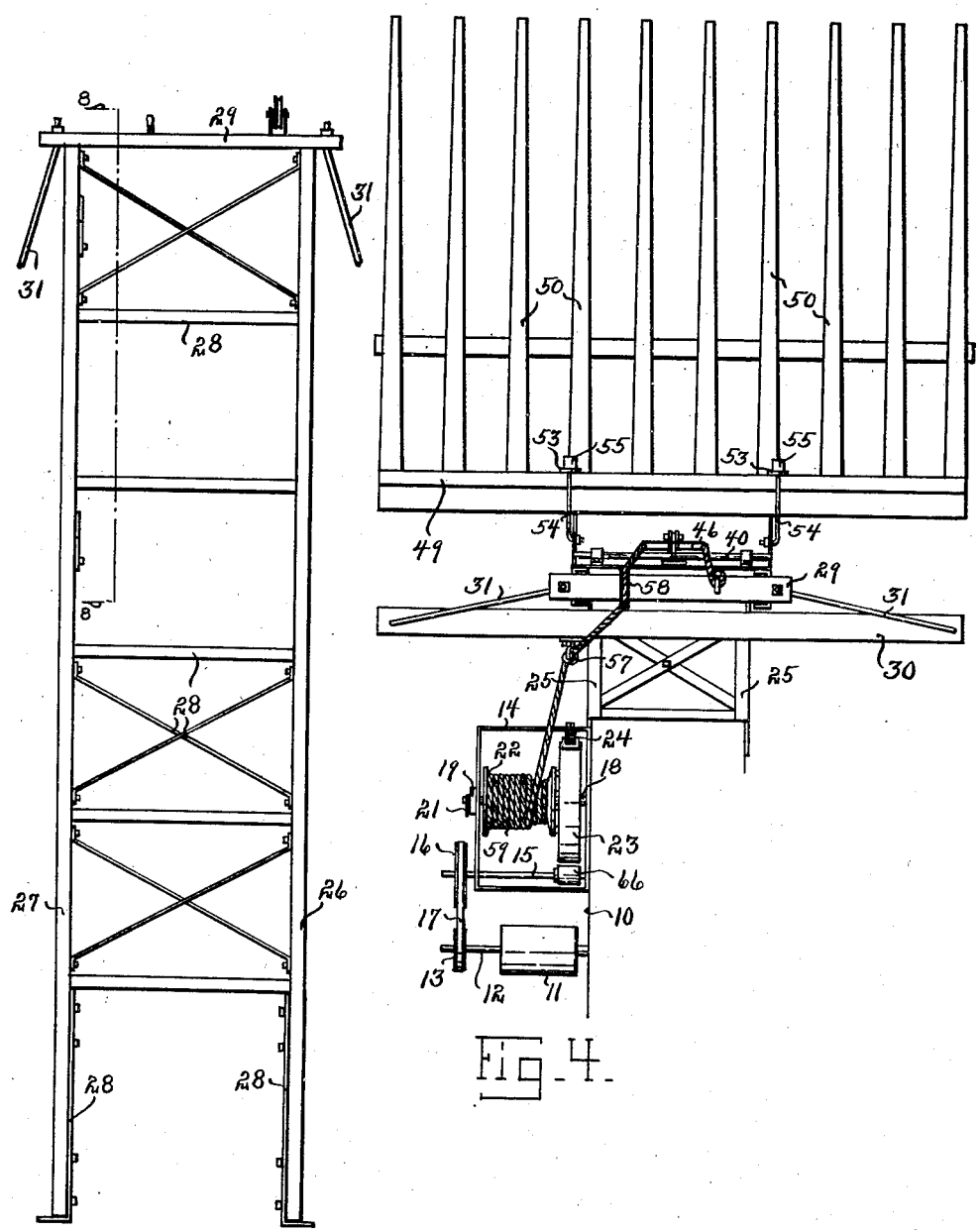

Sept. 15, 1942. M. DUDEN 2,295,895
SWEEP RAKE STACKER AND LOADER
Filed Sept. 3, 1940 3 Sheets-Sheet 3
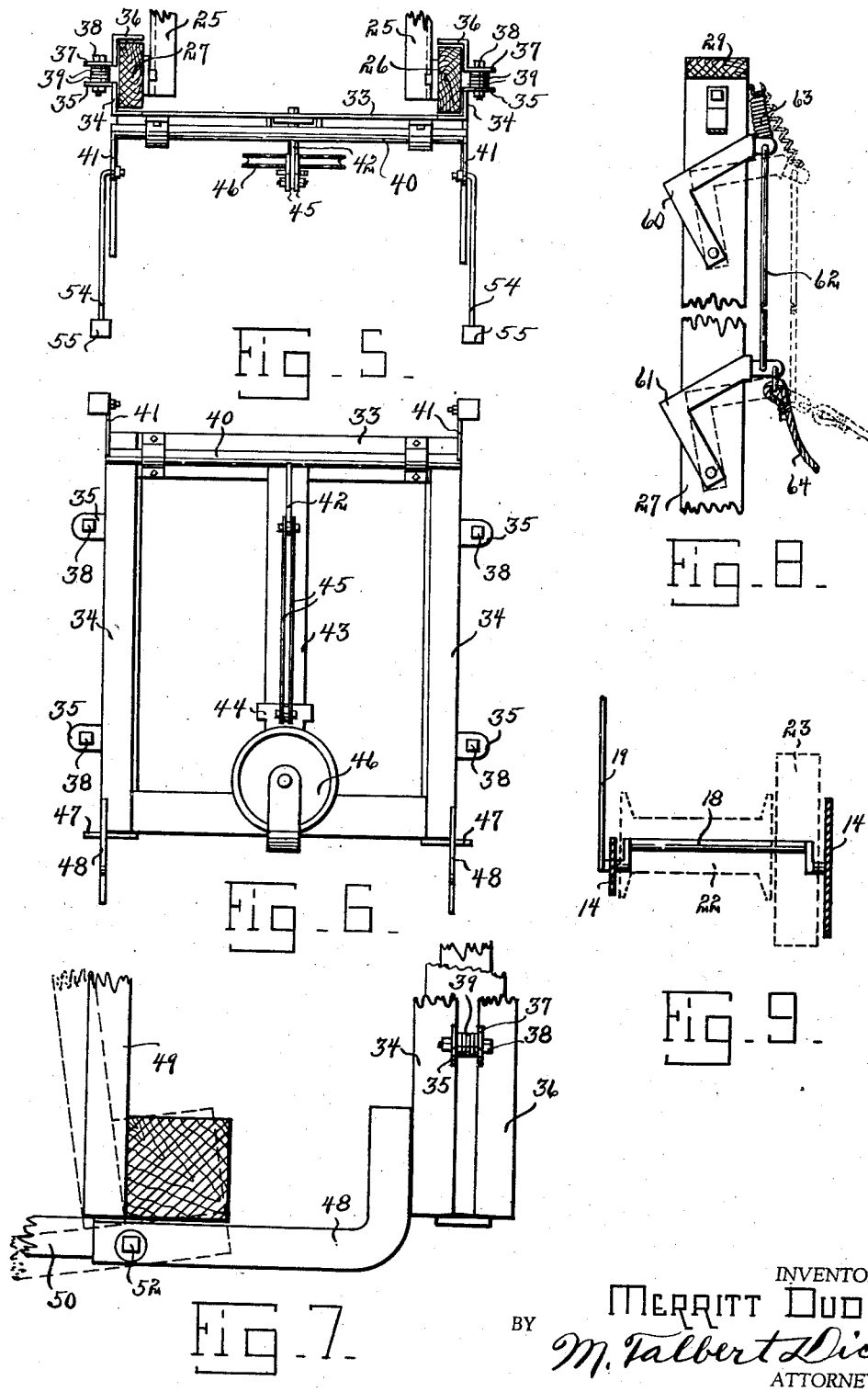
INVENTOR.
MERRITT DUDEN
BY M. Talbert Dick
ATTORNEY.

Patented Sept. 15, 1942

2,295,895

UNITED STATES PATENT OFFICE 2,295,895

SWEEP RAKE STACKER AND LOADER

Merritt Duden, Indianola, Iowa

Application September 3, 1940, Serial No. 355,192

3 Claims. (Cl. 214—113)

The principal object of my invention is to provide a highly efficient stacker and loader capable of being mounted on a tractor or similar mobile unit.

A still further object of this invention is to provide a sweep rake stacker and loader wherein the sweep rake is held stable throughout all operations of the device.

A still further object of this invention is to provide a sweep rake stacker that is capable of also being operated for unloading hay and the like as well as loading and stacking of the same.

A still further object of my invention is to provide a sweep rake stacker and loader that is under the complete control of the operator at all times.

A still further object of this invention is to provide a sweep rake stacker and loader that is safe in operation, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 3 is a front elevational view of the vertical upright frame portion.

Fig. 4 is a top plan view of my device illustrating the means by which the same is controlled.

Fig. 5 is a detail top plan view in section of the frame portion.

Fig. 6 is a front view of a portion of my device, showing the fork carrying mechanism.

Fig. 7 is an enlarged view of a portion of my device taken on line 7—7 of Fig. 2.

Fig. 8 is an enlarged side view of the sweep rake catch means, taken on line 8—8 of Fig. 3.

Fig. 9 is a side view of the crank-shaft control means.

Figure 1:
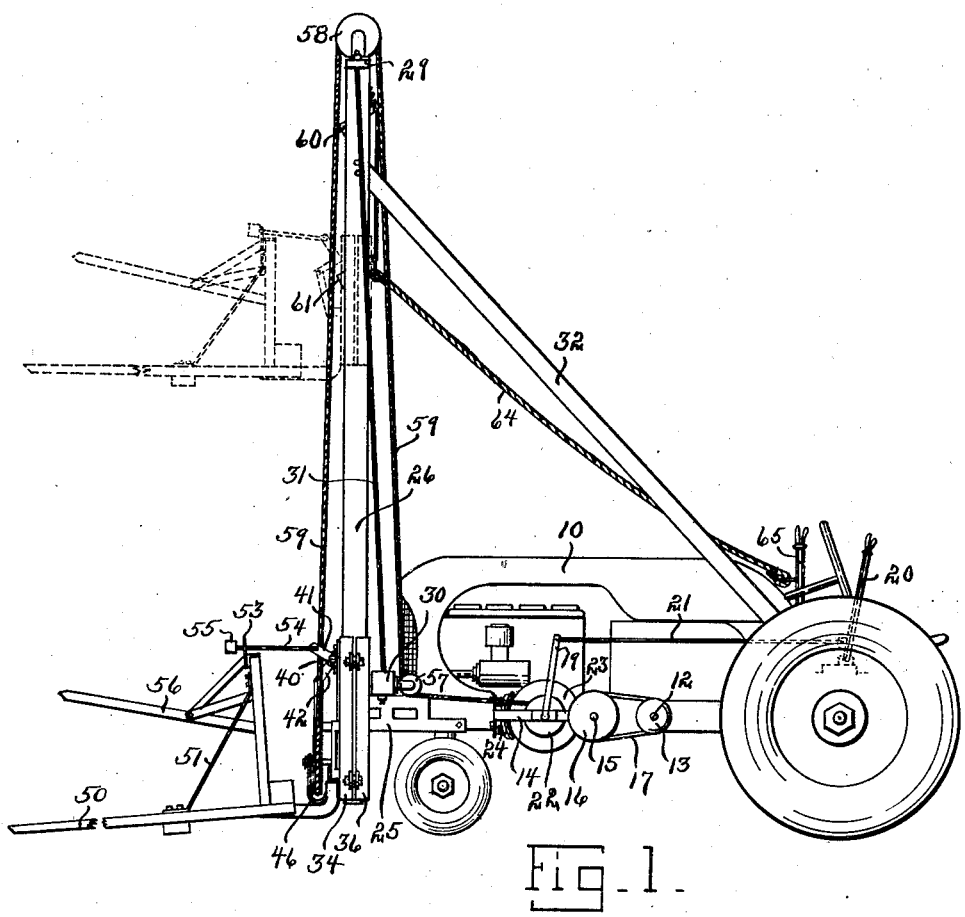
Fig. 1 is a side elevational view of my device mounted on a mobile unit.

Referring to the drawings, I have used the numeral 10 to designate a tractor or like mobile power unit having the usual power take-off 11. It is to such a tractor I attach my device and which I will now describe in detail. The numeral 12 designates a shaft extended from the power take-off 11 and carrying a pulley wheel 13. The numeral 14 designates a frame means securing to the tractor forward of the power take-off as shown in Fig. 4. The numeral 15 designates a shaft rotatably mounted in the rear portion in the frame 14. The numeral 16 designates a pulley wheel on the shaft 15. The numeral 17 designates an endless belt embracing pulley wheels 13 and 16. The numeral 18 designates a shaft rotatably mounted in the frame 13. This shaft may be in the form of a crank shaft as shown in Fig. 9 in order that when rotating in one direction its central area will move forwardly and when rotated in the other direction will move rearwardly. Other concentric means may be employed. The numeral 19 designates an arm secured to the shaft 18. The numeral 20 designates a lever on the tractor and the numeral 21 designates a connecting element having one end secured to the arm 19 and the other end connected to the lever 20. The numeral 22 designates a reel drum rotatably mounted on the shaft 18. The numeral 23 designates a brake drum rotatably mounted on the shaft 18 and rigidly secured to the drum 22. The numeral 24 designates a brake shoe on the frame 14 and forward of the brake drum 23. When the shaft 18 moves in one direction the brake drum 23 is capable of engaging the brake shoe 24 and when the shaft 18 is rotated in the opposite direction by the lever 20 the brake will be moved to the rear and out of engagement with the brake shoe. The numeral 25 designates brackets secured on the two forward sides of the tractor 10 by bolts or the like. The numerals 26 and 27 designate two vertical beams rigidly spaced apart and secured to the members 25 by braces and bolts 28. The braces secure these two members together as shown in Fig. 3. The numeral 29 designates a bar that is secured to and extends over the top of the two members 26 and 27. The numeral 30 designates a horizontal beam secured to the members 25. Supporting guide rods 31 extend from each of the end portions of the members 30 respectively upwardly and inwardly to engage the two ends of the member 29 respectively. The numeral 32 designates brace elements extending from the upper portion of the members 26 and 27 downwardly and rearwardly to engage the tractor 10 as shown in Fig. 1. By this construction the members 26 and 27 will be rigidly held in vertical position on the forward end of the tractor and provide a track means as shown in Fig. 3. The members 26 and 27 are each rectangular in cross-section as shown in Fig. 5. The numeral 33 designates a metal box frame as shown in Fig. 6.

Figure 2:
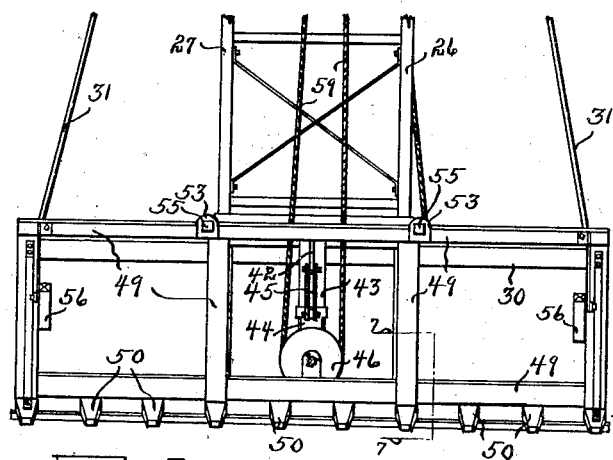
Fig. 2 is a front view of the loader portion of my rake and stacker.

The numeral 34 designates two elongated angle irons on the rear side of vertical box frame which also form the sides of the frame 33. These two angle irons embrace the forward outer corners of the two vertical beams 26 and 27 respectively. On the rear edge of each of the members 34 is formed two outwardly extending lips 35. The numeral 36 designates two elongated angle irons embracing the outer rear corner portions of the beams 26 and 28, respectively. Each of these angle irons 36 has two outwardly extending lip members 37, adjacent and spaced apart from the lip members 35, respectively. The numeral 38 designates a bolt extending through each pair of lips 35 and 37. The numeral 39 designates washers on the bolts 38 and between each pair of lips 35 and 37. By adding or subtracting the number of washers 39 the lips may be adjusted toward or away from each other, thereby, successfully slidably adjusting the angle irons around elongated beams 26 and 27 as shown in Fig. 5. As the frame 33 carries the upper rake portion, it is obvious that the same may be quickly removed or replaced on a tractor merely by removing the bolts 38. The numeral 40 designates a shaft rotatably mounted on the upper forward end of the frame 33 as shown in Fig. 6. The numeral 41 designates a link member on each end of the shaft 40, normally extending forwardly and upwardly. The numeral 42 designates a link member having one end secured to the central portion of the shaft 40 and normally extending forwardly and downwardly. The numeral 43 designates a vertical track secured to the central portion of the frame 33. The numeral 44 designates a bearing member capable of vertical reciprocation of the member 43. The numeral 45 designates a pair of link members each having one end pivotedly secured to the member 44 and their other ends secured to member 42. The numeral 46 designates a pulley wheel rotatably secured to the member 44. The downward movement of the frame 33 is limited by the stop members 47 on the track structure 26 and 27. The member 29 limits the upward sliding movement of the frame 33. The numeral 49 designates the rear vertical portion of the rake which remains substantially vertical. Extending forwardly from the lower portion of this back portion 49 are the elongated tooth elements 50 as shown in the drawings. The numeral 51 designates a brace member for rigidly binding the tooth elements to the back portion 49. These tooth elements, the back portion 49 and brace elements combine to form the rake portion, which is pivoted at its rear back end to the members 48 by bolts or like 52 as shown in Fig. 7. The numeral 53 designates two ear members on the upper portion of the rake frame 49. The numeral 54 designates rod members having their rear ends bent at right angles to rotate in the forward end portions of the members 41 respectively. These rods 54 are slidably extended through the two ears 53 respectively and each has a head member 55 on their forward free ends to prevent their withdrawal from the members 53. The numeral 56 designates forwardly extending elongated side pieces on the side portions of the frame 49 as shown in Figs. 1 and 2. The numeral 58 designates a pulley wheel mounted on the top of the member 29. The numeral 59 designates a flexible cable having one end secured in the usual manner around the rear drum 22, wound around the drum 22 and extending, first forwardly to extend around the pulley wheel 57, then upwardly to extend over pulley wheel 58, then downwardly to extend around the pulley wheel 46 and then upwardly and fastened to the cross beam 29 as shown in Fig. 4. The numeral 60 and the numeral 61 designate two stop members spaced apart and having one of their ends pivoted to the vertical post 27 as shown in Fig. 8. The numeral 62 designates a link member connecting the two free ends of the members 60 and 61 together. The numeral 63 designates a coil spring having one end connected to the post 27 and its other end connected to the free end of the member 60. This coil spring yieldingly holds the members 60 and 61 in position where they over-lap the forward edge of the post 27. When the fork mechanism moves upwardly on the tracks 26 and 27 the frame 33 may ride over and past both of these members 60 and 61. However, the frame 33 will be unable to pass downwardly past either of the members 60 or 61 unless they are manually moved against the action of the spring 63 to the rear as shown by dotted lines in Fig. 8. I accomplish the manual movement of these members to the rear by cable 64 attached to the free end of the member 61 and a hand lever 65 on the tractor.

The practical operation of my apparatus is as follows: With the rake in a position as shown in Fig. 1 the tractor is moved forwardly in order to bring the teeth 50 under the hay, straw, bundles, or like, to be loaded. When a sufficient amount of material is on the fork the lever 20 is pulled to the rear bringing the wheel 23 into contact with a pulley wheel 66 on the shaft 15. As the shaft 15 is being rotated by the engine of the tractor the pulley 23 will be rotated, thereby rotating the drum 22. With the drum 22 rotating the cable 59 will be wound thereon, moving the sweep rake upwardly on the tracks 26 and 27. The first movement, however, of the rake will be to move its upper frame end to the rear and raise the elongated teeth 50 to a position where they extend horizontally to forwardly and slightly upwardly. Normally when the rake is in a lowered position these teeth extend forwardly and downwardly. The referred to action is accomplished by the tightening of the cable on the pulley wheel 46 thereby sliding the bearing member 44 upwardly which moves the links 45 upwardly and the arm 42 upwardly, thereby rotating the shaft 40 to the right. This initial rotation of the shaft 40 moves the rods 54 to the rear until the head members 55 engage the ears 53 and pull the upper portion of the member 49 of the rake to the rear, thereby pivoting it on its securing means 52. After the forward end of the teeth 50 have been properly elevated the entire fork and its carriage will be pulled upwardly by the cable 59 inasmuch as the carriage is slidable on the member 26 and 27. If it is desired to stop the fork at any point along the tracks 26 and 27 it is merely necessary to move the lever 20 forwardly. Immediately the pull upon the cable 59 will move the brake wheel 23 out of engagement with the driving wheel 66 and into engagement with the brake shoe 24 which locks and stops the rotation of the drum 22. If it is desired to lower the rake it is merely necessary to manually move the lever 20 to the rear to bring the brake wheel 23 slightly out of engagement with the brake 24 but yet not quite in engagement with the drive wheel 66. Obviously the downward speed of the fork will be controlled by the amount of friction of the wheel 23 on the brake shoe and the speed of movement of the fork upwardly will depend upon the amount of frictional engagement between the wheels 23 and 66. The operation of the device is therefore highly flexible and may be completely controlled regardless of the load on the fork. Unless the fork is moved above the engaging point on either of the members 60 or 61 the fork cannot thereafter be lowered without moving the lever 65 to the rear. These two stops 60 and 61 provide two positions for rigidly holding the fork in an elevated position. After the fork has engaged one of the members 60 or 61 and the lever 20 is moved forwardly, pull is removed on the bearing 44 and due to the weight of the fork its outer end tilts downwardly moving the member 44 to a lowered position on the member 43. With the teeth of the fork extending downwardly and forwardly the fork is in a position for unloading its burden and if it is above or resting on the stack being formed it is merely necessary to reverse the tractor, moving the entire equipment to the rear and leaving the hay or like on the stack. If the stack is some distance from where the material is being obtained, the fork should be held in substantially horizontal position by the brake means 24 during the journey to the stack. The members 60 and 61 also serve as safety means in case the cable 59 broke.

Obviously my apparatus may be used for loading and unloading hay racks. It is particularly desirable as a stacker and the operation of the device is at all times under the control of the operator.

Some changes may be made in the construction and arrangement of my improved sweep rake stacker and loader without departing from the real spirit and purpose of my invention, and it is my invention to cover by my claims any modified forms of structure or use of mechanical equivalents which may be reasonably included within their scope.

I claim:

1. In a device of the class described, a vertical track frame, a second frame slidably mounted on said track frame, a fork means operatively pivotally secured at its rear lower end portion to said second frame, a bearing member vertically slidably mounted on said second frame, a pulley wheel on said bearing member, connecting members operatively linking said bearing member with the rear upper portion of said fork means, a pulley wheel on the upper portion of said track frame, and a flexible cable having one end secured to the upper portion of said track frame, extending downwardly around said pulley wheel on said bearing member, then upwardly and over the pulley wheel on said track frame and then designed to extend to a power operated drum or like.

2. In a device of the class described, a vertical track frame, a second frame slidably mounted on said track frame, a fork means operatively pivotally secured at its rear lower end portion to said second frame, a bearing member vertically slidably mounted on said second frame, a pulley wheel on said bearing member, connecting members operatively linking said bearing member with the rear upper portion of said fork means, a pulley wheel on the upper portion of said track frame, a flexible cable having one end secured to the upper portion of said track frame, extending downwardly around said pulley wheel on said bearing member, then upwardly and over the pulley wheel on said track frame and then designed to extend to a power operated drum or like, catch means on said track frame capable of engaging said second frame, and a manual means for placing said catch means in inoperative condition.

3. In a device of the class described, a vertical track frame, a second frame slidably mounted on said track frame, a fork means operatively pivotally secured at its rear lower end portion to said second frame, a bearing member vertically slidably mounted on said second frame, a pulley wheel on said bearing member, a crank arm secured to said second frame, a link connecting said bearing member to said crank arm, an ear secured to the upper rear end portion of said fork means, a headed link member slidably extending through said crank arm, a pulley wheel on the upper portion of said track frame, and a flexible cable having one end secured to the upper portion of said track frame, extending downwardly around said pulley on said bearing member, then upwardly over the pulley wheel on said track frame and then downwardly with its end designed to be operatively secured to a power drum or like.

MERRITT DUDEN.